United States Patent
Wasserblat et al.

(10) Patent No.: US 8,145,562 B2
(45) Date of Patent: Mar. 27, 2012

(54) APPARATUS AND METHOD FOR FRAUD PREVENTION

(76) Inventors: Moshe Wasserblat, Maccabim (IL); Yuval Lubowich, Raanana (IL)

( * ) Notice: Subject to any disclaimer, the term of this patent is extended or adjusted under 35 U.S.C. 154(b) by 411 days.

(21) Appl. No.: 12/399,999

(22) Filed: Mar. 9, 2009

(65) Prior Publication Data
US 2010/0228656 A1    Sep. 9, 2010

(51) Int. Cl.
*G06Q 40/00* (2012.01)
(52) U.S. Cl. ......................................................... 705/38
(58) Field of Classification Search ...................... 705/38
See application file for complete search history.

(56) References Cited

U.S. PATENT DOCUMENTS

| | | | |
|---|---|---|---|
| 5,548,647 A * | 8/1996 | Naik et al. ...................... | 704/200 |
| 6,480,825 B1 * | 11/2002 | Sharma et al. ................. | 704/270 |
| 2010/0082490 A1 * | 4/2010 | Rosenblatt et al. ............. | 705/64 |

* cited by examiner

*Primary Examiner* — Charles Kyle
*Assistant Examiner* — Clifford Madamba

(74) *Attorney, Agent, or Firm* — Soroker Agmon

(57) ABSTRACT

The disclosed method and apparatus combine interactions and transactions in order to detect fraud acts or fraud attempts. In one embodiment, one or more interactions is correlated with one or more transactions, the interactions is and transactions features are combined, and features are extracted from the combined structure. The features are compared against one or more profiles, and a combined risk score is determined for the interactions or transactions. If the risk score exceeds a predetermined threshold, a preventive/corrective action can be taken.

In another embodiment, behavioral characteristics extracted from one or more interactions associated with a transaction, with a risk score obtained by analyzing the transaction. The behavioral characteristic are used to enhance suspicion level related to a transaction being fraudulent, and to enable the taking of measures related to the transaction or to the person handling the transaction. The combination thus enables better assessment whether a particular interaction or transaction is fraudulent, and therefore provides for better detection or prevention of such activities. In addition, making the fraud assessment more reliable enables more efficient resource allocation of personnel for monitoring the transactions and interactions, better usage of communication time by avoiding lengthy identification where not required, and generally higher efficiency.

21 Claims, 5 Drawing Sheets

APPARATUS AND METHOD FOR FRAUD PREVENTION

TECHNICAL FIELD

The present invention relates to fraud prevention in general, and to an apparatus and method for preventing fraud in financial organizations, by collecting data related to interactions and transactions, in particular.

BACKGROUND

Large organizations, and in particular financial organizations such as banks, insurance companies, credit card companies or others, often employ or host contact centers or other units which hold numerous interactions with customers, users, suppliers or other persons on a daily basis. The interactions include phone calls using all types of phone equipment including landline, mobile phones, voice over IP and others, recorded audio events, walk-in center events, video conferences, e-mails, chats, captured web sessions, captured screen activity sessions, instant messaging, access through a web site, audio segments downloaded from the internet, audio files or streams, the audio part of video files or streams or the like.

Another aspect of the financial organization's activity is represented in the performed transactions, including managing accounts, transferring funds between accounts of the same person or entity, transferring funds between accounts belonging to different entities, making purchases, making investments, liquidating resources, or the like. The transactions are generally represented as computerized records, which are usually stored in a database stored on a storage device.

A part of all interactions and transactions represent fraudulent activities or fraudulent attempts. Such fraudulent activities or fraud attempts can be of any type, including but not limited to identity theft, i.e., a person pretending to be another person, a deception act by an account holder in order to gain financial benefits, pretending to represent an entity without proper authorization, attempting to perform forbidden activities such as transferring money without authorization or without sufficient authorization, dishonestly denying credit card purchases, or the like.

Fraudulent activities and fraudulent attempts require significant resources from the financial organizations in detection and prevention of fraud. These resources have to be allocated, since all fraudulent acts eventually get discovered, because there is another person or entity on the losing side. However, the faster and more efficient the act is discovered, the more efficient is the damage control, and avoidance of further fraudulent acts.

Tracking the transactions on one hand, and monitoring many of the interactions on the other hand are labor intensive, and thus induce high expenses on the companies. However, even if major resources are used, prevention is incomplete and the organizations suffer heavy losses due to undetected or non-prevented activities. In addition, the time consuming ID verification stage required in every interaction also incurs high expenses on the organizations.

There is thus a need in the art for a system and method that will supply better detection and prevention for fraud activities in financial environments.

SUMMARY

A method and apparatus for detecting fraud act or fraud attempt in call center, based on combining data from transactions with data from interactions associated with the transactions.

A first aspect of the disclosure relates to a method for detecting a fraud act or a fraud attempt represented in one or more interactions in a call center associated with an organization, the method comprising the steps of: receiving one of the interactions captured by a capturing or logging device; correlating the interaction with one or more of the transactions; receiving the transactions: combining the interaction and the one or more transactions to a combined structure; extracting two or more features from the combined structure by two or more extraction components: scoring the features against a user profile to obtain a combined score; and taking a safety measure in accordance with said combined score. The method can further comprise generating the user profile. Within the method, the user profile optionally comprises a behavioral characteristic and a transactional characteristic. Within the method, optionally one or more of the features is optionally selected from the group consisting of: a vocal feature: a behavioral feature; and a textual feature; and one or more of the features is a transactional feature. Within the method, the interaction is optionally a vocal interaction or a textual interaction. The method can further comprise a speech to text step for extracting text from the interaction. The method can further comprise a training step for training one or more of the extraction components.

Another aspect of the disclosure relates to an apparatus for detecting a fraud act or a fraud attempt represented in one or more interactions in a call center associated with an organization, the apparatus comprising: a capturing or logging device for capturing one or more interactions associated with the transaction and captured in a contact center associated with the organization: an interaction and transaction correlation component for correlating one of the interactions with one or more transactions, thereby creating a combined structure; two or more extraction components each arranged to extract one or more feature from the combined structure; a transaction and interaction scoring component for scoring the features against a user profile to obtain a combined score; and a profiling component for generating the user profile. Within the apparatus, one or more of the extraction components are optionally selected from the group consisting of: an acoustic indicator extraction component; a stress level extraction engine; an emotion level extraction engine: a sentiment level extraction engine; a talk patter extraction engine; a gender extraction engine: a linguistic indicator extraction engine: a textual indicator extraction component; a context or language model mismatch extraction engine: a Natural Language Processing mismatch extraction engine and a voice print matching engine, and one or more of the extraction components is optionally a transactional extraction component. The apparatus can further comprise a speech to text engine for extracting text from a vocal interaction.

Yet another aspect of the disclosure relates to a computer readable storage medium containing a set of instructions for a general purpose computer, the set of instructions comprising: receiving one or more interactions captured by a capturing or logging device: correlating one of the interactions with one or more transactions; receiving the transactions; combining one or more of the interactions and one or more of the transactions to a combined structure; extracting two or more features from the combined structure by two or more extraction components: scoring the features against a user profile to obtain a combined score; and taking a safety measure in accordance with said combined score.

Yet another aspect of the disclosure relates to a method for a fraud act or a fraud attempt represented in one or more interactions in a call center associated with an organization, the method comprising the steps of: receiving the interactions captured by a capturing or logging device; extracting one or more features from one or more of the interactions by one or more extraction components; correlating one of the interactions with one or more transactions; receiving the transactions: scoring the transactions against a profile to obtain a first score; combining the first score with the feature to obtain a combined score; and taking a safety measure in accordance with said combined score. The method can further comprise the step of generating the profile. Within the method the profile is optionally selected from the group consisting of: a user profile, a user group profile, a transaction profile, and a transaction type profile. Within the method one of the features is optionally a vocal feature or a textual feature. Within the method, one of the interactions is optionally a vocal interaction or a textual interaction. The method can further comprise a speech to text step for extracting text from a vocal interaction. The method can further comprise a training step for training the one or more of the extraction components.

Yet another aspect of the disclosure relates to an apparatus for analyzing one or more transactions associated with an organization, the apparatus comprising: a capturing or logging device for capturing one or more interactions associated with the transaction and captured in a contact center associated with the organization; an extraction component arranged to extract one or more features from the interactions; a transaction scoring component for associating a first score with one of the transactions; and a combined scoring component for combining the feature with the first score to obtain a combined score for the transaction. The apparatus can further comprise a transaction and interaction correlation component for associating one of the interactions with one of the transactions. Within the apparatus, the extraction component is optionally an acoustic indicator extraction component. Within the apparatus, the extraction component is optionally selected from the group consisting of: a stress level extraction engine; an emotion level extraction engine; a sentiment level extraction engine; a talk patter extraction engine; a gender extraction engine; a linguistic indicator extraction engine; and a voice print matching engine. Within the apparatus, the extraction component is optionally a textual indicator extraction component. Within the apparatus, the extraction component is optionally selected from the group consisting of: a context or language model mismatch extraction engine, a stress level extraction engine; an emotion level extraction engine; a sentiment level extraction engine; and a Natural Language Processing mismatch extraction engine. The apparatus can further comprise a speech to text engine for extracting text from one or more vocal interaction.

Yet another aspect of the disclosure relates to a method for one or more interactions captured in a call center associated with an organization, the method comprising the steps of: receiving the interactions captured by a capturing or logging device; extracting a voice print or a voice sample from one or more of the interactions; comparing the voice print or voice sample to one or more speaker models to obtain a similarity score; determining a fraud risk score from the similarity score and from one or more characteristics associated with a transaction related to the interaction; and taking a safety measure when said fraud risk score exceeds a predetermined threshold.

Yet another aspect of the disclosure relates to a computer readable storage medium containing a set of instructions for a general purpose computer, the set of instructions comprising: receiving one or more interactions captured by a capturing or logging device; extracting one or more features from the interactions by one or more extraction components; receiving one or more transactions; scoring the transaction against a profile to obtain a first score; combining the first score with the features to obtain a combined score; and taking a safety measure in accordance with said combined score.

BRIEF DESCRIPTION OF THE DRAWINGS

The present invention will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
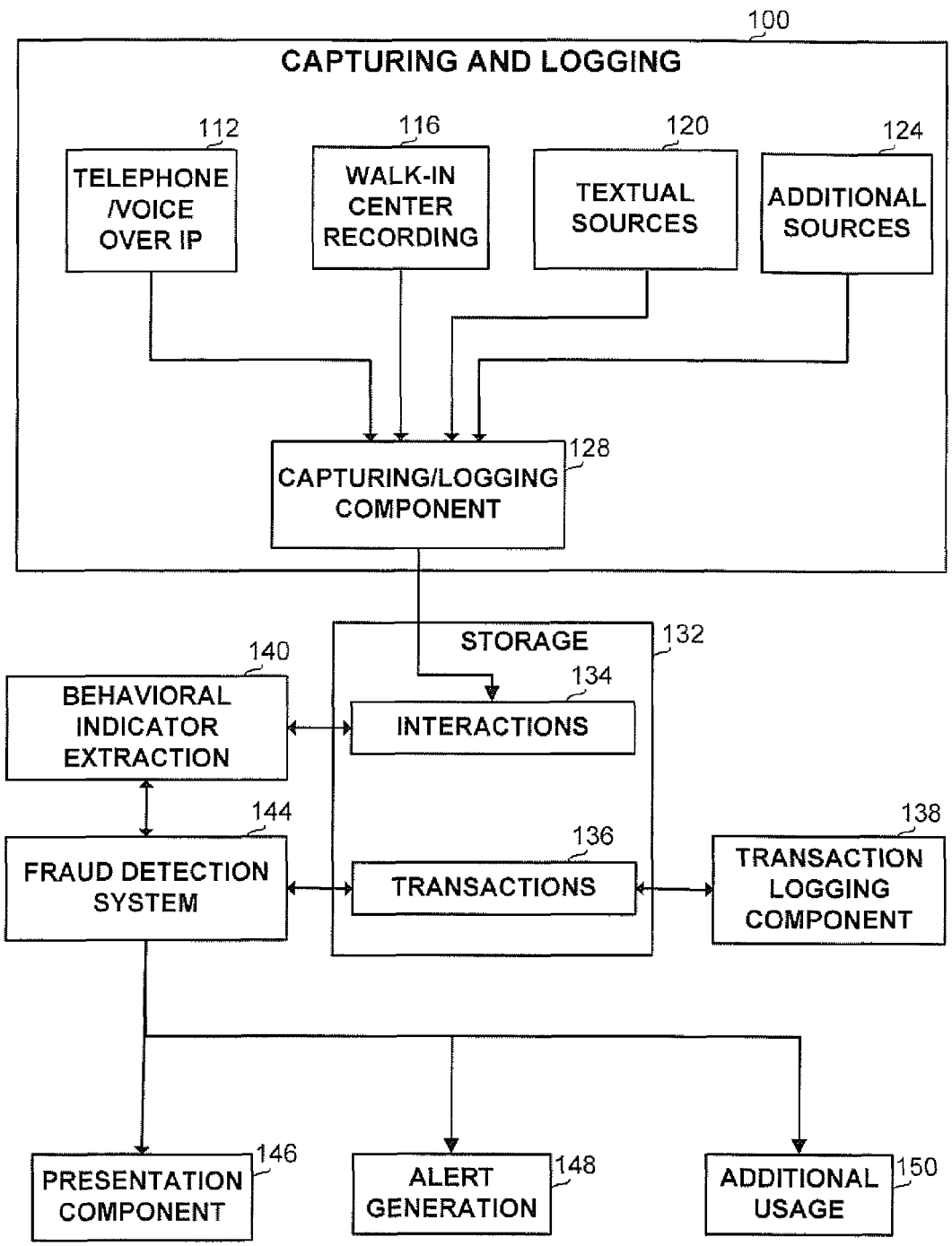
FIG. 1 is a block diagram of the main components in a typical environment in which the disclosed method and apparatus are used.

The disclosure relates to U.S. Pat. No. 6,965,886 and to U.S. patent application Ser. No. 12/254,455 filed on Oct. 20, 2008, titled "System and method for multi layer rule processing background", the full contents of both incorporated herein by reference.

An apparatus and method for detecting and preventing fraud and fraud attempts in a contact center environment, and in particular in a contact center of a financial organization.

A transaction is an operation having financial implication, such as transferring money or funds between accounts, paying bills, depositing money, withdrawing money, making investments, buying or selling goods or services, granting access to an account, or the like.

An interaction is any occurrence in which a customer, supplier, associate or any other person communicates with an organization. Interactions can take place over a phone call using any technology such as landline, cellular phone. Voice over IP (VoIP) or others, in a walk-in environment such as a bank branch, via fax, via a website or another computerized application, in a video conference or in any other manner. An interaction can be associated with zero, one or more transactions, and a transaction can be associated with zero, one or more interactions.

In one embodiment, the method and apparatus correlate one or more interactions with one or more transactions, and combines them into a combined entity or structure.

The combined structure is then matched against one or more pre-generated profiles relating to speaker-interaction combinations.

A feature vector is then determined for the combined structure, by extracting relevant features from the combined structure. The features may include one or more speaker behavioral features or indicators, as well as transaction-related features or indicators.

A combined risk score is determined for the feature vector, based on its similarity or dissimilarity to the customer-interaction profile.

A risk score may be defined as the certainty that the transaction, interaction, or a combination thereof is associated with a fraudulent act.

Using the combined feature vector comprising features related to the transaction as well as to the interaction or the customer thus enables better assessment whether a particular interaction or transaction is fraudulent, and therefore provides for better detection or prevention of such activities. In addition, making the fraud assessment more reliable enables more efficient resource allocation of personnel for monitoring the transactions and interactions, better usage of communication time by avoiding lengthy identification where not required, and generally higher efficiency.

In another embodiment, the method and apparatus determine a risk score for an interaction, based on speaker behavioral features or indicators extracted from the interaction. In determining the risk score for the interaction, the behavioral features or indicators may be compared against a user profile. Then, a second risk score is determined for the transaction, based on features extracted from the transaction. In determining the second risk score, the transaction is evaluated, and optionally compared against a transaction profile of the particular user, a group of users, or one or more transaction types, in order to assess the probability of the transaction being fraudulent.

The two risk scores, or the second risk score together with the speaker behavioral features or indicators extracted from the interaction, are then combined into a single combined score. The combined score enables better detection of fraudulent acts or fraudulent attempts, and thus prevention of.

The same merits as detailed in association with the first embodiment are also valid for the second embodiment.

The behavioral indicators of the person involved in the interaction extracted from the interaction, may include for example mental state, stress level, used vocabulary, semantic, talk pattern, linguistic and vocal parameters, or the like. Behavioral parameters can be extracted from all interaction types, including vocal interactions or vocal components of interactions, textual interactions, or others Referring now to FIG. 1, showing a typical environment in which the disclosed method and apparatus are used The environment is preferably an interaction-rich organization, typically a call center, a bank, a trading floor, an insurance company or another financial institute, a public safety contact center, an interception center of a law enforcement organization, a service provider, an internet content delivery company with multimedia search needs or content delivery programs, or the like. Segments, including interactions with customers, users, organization members, suppliers or other parties are captured, thus generating input information of various types. The information types optionally include auditory segments, video segments, textual interactions, and additional data. The capturing of voice interactions, or the vocal part of other interactions, such as video, can employ many forms, formats, and technologies, including trunk side, extension side, summed audio, separate audio, various encoding and decoding protocols such as G729, G726, G723.1, and the like. The interactions are captured using capturing or logging components 100. The vocal interactions usually include telephone or voice over IP sessions 112. Telephone of any kind, including landline, mobile, satellite phone or others is currently the main channel for communicating with users, colleagues, suppliers, customers and others in many organizations. The voice typically passes through a PABX (not shown), which in addition to the voice of two or more sides participating in the interaction collects additional information such as CTI information. A typical environment can further comprise voice over IP channels, which possibly pass through a voice over IP server (not shown). It will be appreciated that voice messages are optionally captured and processed as well, and that the handling is not limited to two- or more sided conversation. The interactions can further include face-to-face interactions, such as those recorded in a walk-in-center or by video 116, textual sources 124 such as chat, e-mail, instant messaging, web sessions and others, and additional data sources 124. Additional sources 124 may include vocal sources such as microphone, intercom, vocal input by external systems, broadcasts, files, or any other source. Additional sources may also include non vocal sources such as screen events sessions, facsimiles which may be processed by Object Character Recognition (OCR) systems, or others.

Data from all the above-mentioned sources and others is captured and preferably logged by capturing/logging component 128. Capturing/logging component 128 comprises a computing platform executing one or more computer applications as detailed below. The captured interactions 134 are optionally stored in storage 132 which is preferably a mass storage device, for example an optical storage device such as a CD, a DVD, or a laser disk; a magnetic storage device such as a tape, a hard disk, Storage Area Network (SAN), a Network Attached Storage (NAS), or others; a semiconductor storage device such as Flash device, memory stick, or the like. The storage can be common or separate for different types of captured segments and different types of additional data. The storage can be located onsite where the segments or some of them are captured, or in a remote location. The capturing or the storage components can serve one or more sites of a multi-site organization. Storage 134 can optionally store transactions 136 captured by transaction logging component 138 or received from any other source. Any of stored transactions 136 represents a real-world operation, such as money or fund transfer, paying bills, purchasing services or goods, investing money or the like. The transaction can represent an operation that already took place or a future operation, a partial operation, or the like.

The apparatus further comprises behavioral indicator extraction components 140, designed for extracting indicators from interactions 134. Behavioral indicator extraction components 140 comprise various engines or components that extract relevant characteristics from each type of interaction. For example, voice-related characteristics are extracted from vocal interactions, and textual characteristics are extracted from textual interactions, as detailed in association with FIG. 2, FIG. 3A, FIG. 3B, FIG. 4A and FIG. 4B below. In the context of extracting features from interactions, the terms engines or components are used interchangeably. The apparatus further comprises fraud detection engine 144 for detecting fraud or fraud attempt (also deception act) within any one or more of transactions, interactions. financial action, or a combination thereof. 136. In accordance with the disclosure, fraud detection engine 144 analyzes transactions 136, and combines the analysis with the characteristics extracted by extraction components 140 from interactions 134. Preferably, fraud detection engine 144 combines information related to a transaction with information related to an interaction which is associated with the transaction. For example, the transaction can be associated with an interaction if the transaction was initiated or performed by the interaction, if the same person or another entity is involved in both, or any other association.

The output of fraud detection engine 144 and optionally additional data, such as the risk or danger imposed by an interaction or a transaction, is preferably sent to multiple destinations or used by multiple systems, including but not limited to presentation component 146 for presentation of the interactions, transactions, fraud probabilities and/or any associated data, presented in any manner such as text, graphic, tables, reports or the like. The output of fraud detection engine 144 can also be transferred to alert generation component 148 for raising an alert when the fraud probability determined for one or more transactions exceeds a predetermined threshold, when the fraud probability for one or more transactions is in the top predetermined percentage, or in any other predetermined event. The alert can take any form, including vocal, visual, a sent message, an e-mail, or the like.

It will be appreciated that the alert can be generated in real-time, i.e. as the interaction or transaction occurs, thus giving immediate alert to the agent, his supervisor, a security personnel, or the like. The alert can also be generated off-line, when the interaction, transaction or combination are evaluated. This situation may also provide early discovery and better damage control for fraudulent acts.

The alert can take any form, including but not limited to calling a person, sending an e-mail to a person, sending a message to a person, firing a vocal, visual or any other alarm, or the like.

The output can also be transferred to additional usage 150, including for example quality monitoring of agents handling the interactions, which may be related to whether or not the agents were alert enough to fraud attempts, statistics, or any other usage.

The apparatus preferably comprises one or more computing platforms, executing the disclosed components for carrying out the method detailed below. The computing platform can be a general purpose computer such as a personal computer, a mainframe computer, or any other type of computing platform that is provisioned with a memory device (not shown), a CPU or microprocessor device, and several I/O ports (not shown). The components are preferably components comprising one or more collections of computer instructions, such as libraries, executables, modules, or the like, programmed in any programming language such as C, C++, C#, Java or others, and developed under any development environment, such as .Net, J-b 2EE or others. Alternatively, the apparatus and methods can be implemented as firmware ported for a specific processor such as digital signal processor (DSP) or microcontrollers, or can be implemented as hardware or configurable hardware such as field programmable gate array (FPGA) or application specific integrated circuit (ASIC). The software components can be executed on one platform or on multiple platforms wherein data can be transferred from one computing platform to another via a communication channel, such as the Internet, Intranet, Local area network (LAN), wide area network (WAN), or via a device such as CDROM, disk on key, portable disk or others.

Figure 2:
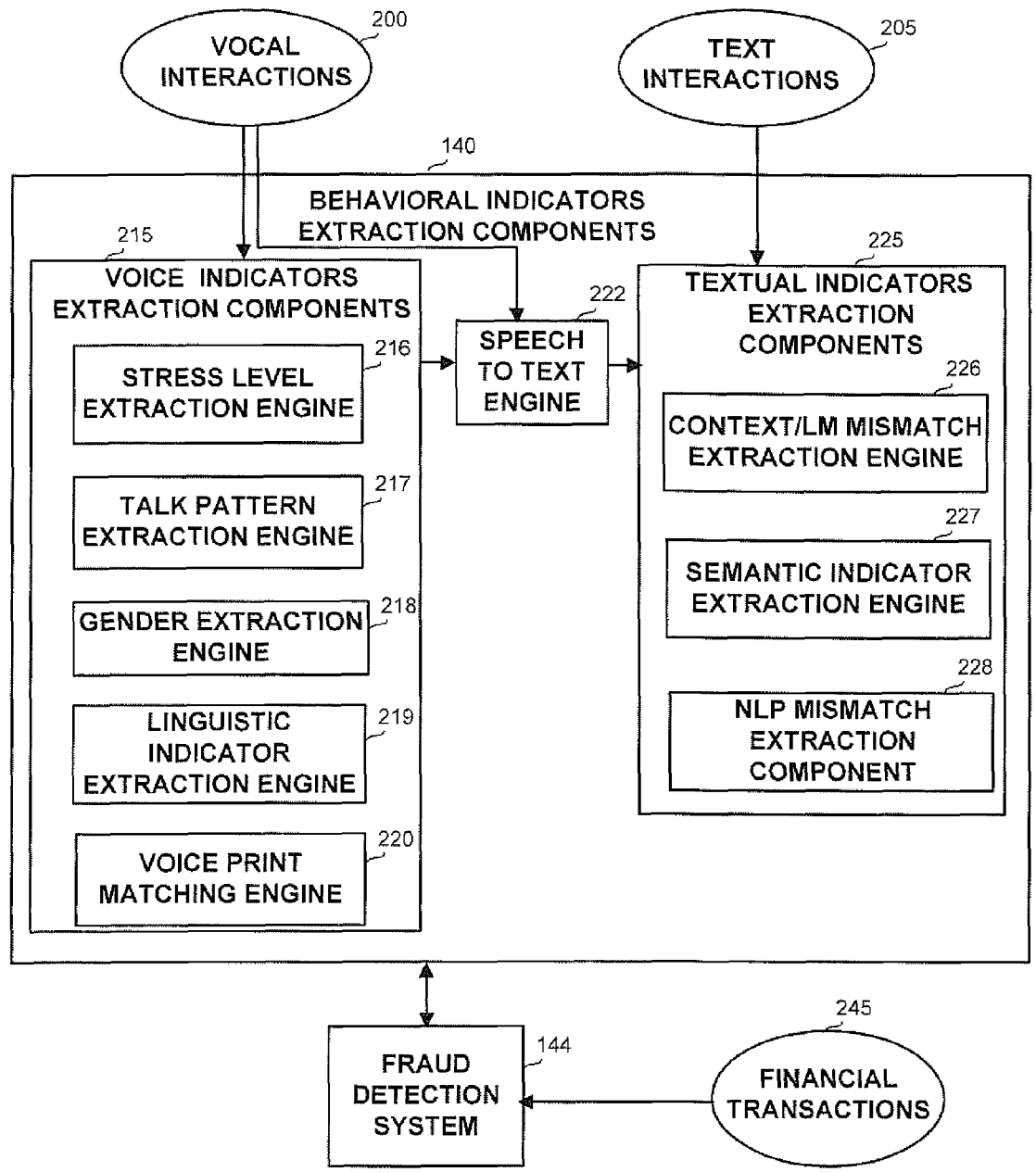
FIG. 2 is a block diagram of the main components in an apparatus for fraud detection and prevention, in accordance with the disclosure.

Referring now to FIG. 2, showing a block diagram of the main components in an apparatus for prevention and detection of fraud or fraud attempts. FIG. 2 provides a specific embodiment of the components generally referred to in FIG. 1 as behavioral characteristic extraction components 140 and fraud detection engine 144.

The components of behavioral characteristic extraction components 140 include voice indicators extraction components 215 for extracting characteristics from vocal interactions or vocal parts of interactions, and textual indicators extraction components 225 for extracting features from textual interactions or textual parts of interactions. Behavioral characteristic extraction components 140 further comprises speech to text engine 222 for extracting text from vocal segments. The resulting text, although it may be "noisy", i.e. inaccurate, and may omit words as well as contain unspoken words, can then be analyzed by textual indicators extraction components 225.

Voice indicators extraction components 215 process audio files or audio streams comprising vocal interactions or parts thereof, or vocal parts of other interactions.

Voice indicators extraction components 215 comprise stress level extraction engine 216, for detecting stress, emotion or sentiment level exhibited in audio interactions or parts thereof. For example, during emotion-rich segments of an interaction, the statistics concerning pitch-based features or energy-based features will differ remarkably from those found during periods of neutral emotion speech.

Voice indicators extraction components 215 further include talk pattern extraction engine 217, for extracting talk pattern features which correlate to a speaker's behavior, such as gestures, fast vs. slow speech rate, talk over percent, number of burst interrupts, pause rate, hesitancy ("The best part of my job is . . . well . . . the best part of my job is the responsibility"), or time-fillers, such as "uh" or "um'., or the like.

Voice indicators extraction components 215 include also gender extraction engine 218, for determining the gender of the speaker, and linguistic indicator extraction component 219, for extracting linguistically based parameters such as accent, native or non-native pronunciation, full diction vs. "sloppy" diction, dysfunctionality of the voice such as not pronouncing certain letters such as /R/), or voice quality, such as breathy, creaky, harsh and whisper, for profiling a speaker's natural variation. A speaker's profile distinguishes a particular person from others and can be used in identifying an imposture.

Voice indicators extraction components 215 also include voice print matching engine 220, for testing to what degree an audio sample conforms to a speaker model or profile built upon speaker behavior features or indicators, and/or acoustic features, such as Mel frequency cepstral coefficient model). Physical traits, such as vocal tract length, are usually estimated based on acoustic and prosodic features, such as pitch or MFCC, where learned traits which are more influenced by the environment, education or other factors are usually estimated based on linguistics, talk-pattern and semantic features, such as sentiment.

Thus, when a customer uses a phone channel of the organization, engine 220 will match the voice print of the calling person to the customer's stored behavioral parameters and would verify the identity of the customer. The engine can also determine whether a genuine customer is providing false information, trying to fool the agent or attempting to conduct an unlawful activity.

Textual indicators extraction components 225 include context/Language Model (LM) mismatch extraction engine 226, for determining mismatch between the speaker's word usage in the interaction, and the claimed speaker's word usage, such as identifying out-of-context words and mismatch in N-gram probability, i.e. word combinations the user uses often.

Textual indicators extraction components 225 further include semantic indicator extraction component 227, for extracting stress emotion or sentiment level from text, for example by looking for words or phrases indicating positive attitude or negative attitude.

Textual indicators extraction components 225 also include Natural Language Processing (NLP) mismatch extraction component 228 for syntactic indicator extraction, such as reasoning for cancelation or un-satisfaction.

It will be appreciated by a person skilled in the art that behavioral indicators extraction components 140 may include additional components, such as additional extraction engines, or preprocessing components for removing noise or separating speakers in audio files or streams, stemming and removing stop words from texts, or the like.

One or more of behavioral characteristic extraction components 140, such as stress/emotion/sentiment extraction engine 216, may require a training phase. During a training phase, training interactions together with manual tagged interactions are received, and relevant operative parameters and features are determined for the engine.

Behavioral characteristic extraction components 140 can output separate characteristic features for one or more interactions, or models of a particular speaker or a group of speakers, which comprise multiple features. The features may include acoustic features as well as linguistic features extracted from interactions, in order to provide as much information as possible and to increase the probability of detecting or preventing fraud or fraud attempts.

The output of behavioral characteristic extraction components 140 is transferred to fraud detection engine 144. Fraud detection engine 144 receive financial transactions 245, represented in any computer-comprehendible format, such as one or more interrelated database records, XML files, or others. Fraud detection engine 144 provides score or other results. The results are optionally transferred back to behavioral characteristic extraction components 140.

It will be appreciated that the apparatus preferably comprises also one or more management components for managing the flow of control and data among the various components of the apparatus, and to or from external components.

Two embodiments of fraud detection engine 144 are described in FIG. 3A and FIG. 4A below, while the corresponding fraud detection methods are described in association with FIG. 3B and FIG. 4B, respectively.

Figure 3A:
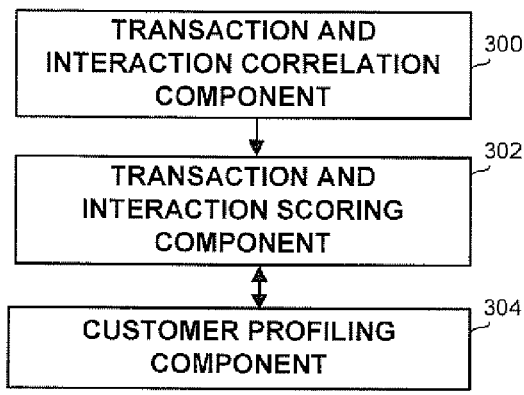
FIG. 3A is a block diagram of the main components in a first embodiment of an engine for fraud detection, in accordance with the disclosure.
Figure 3B:
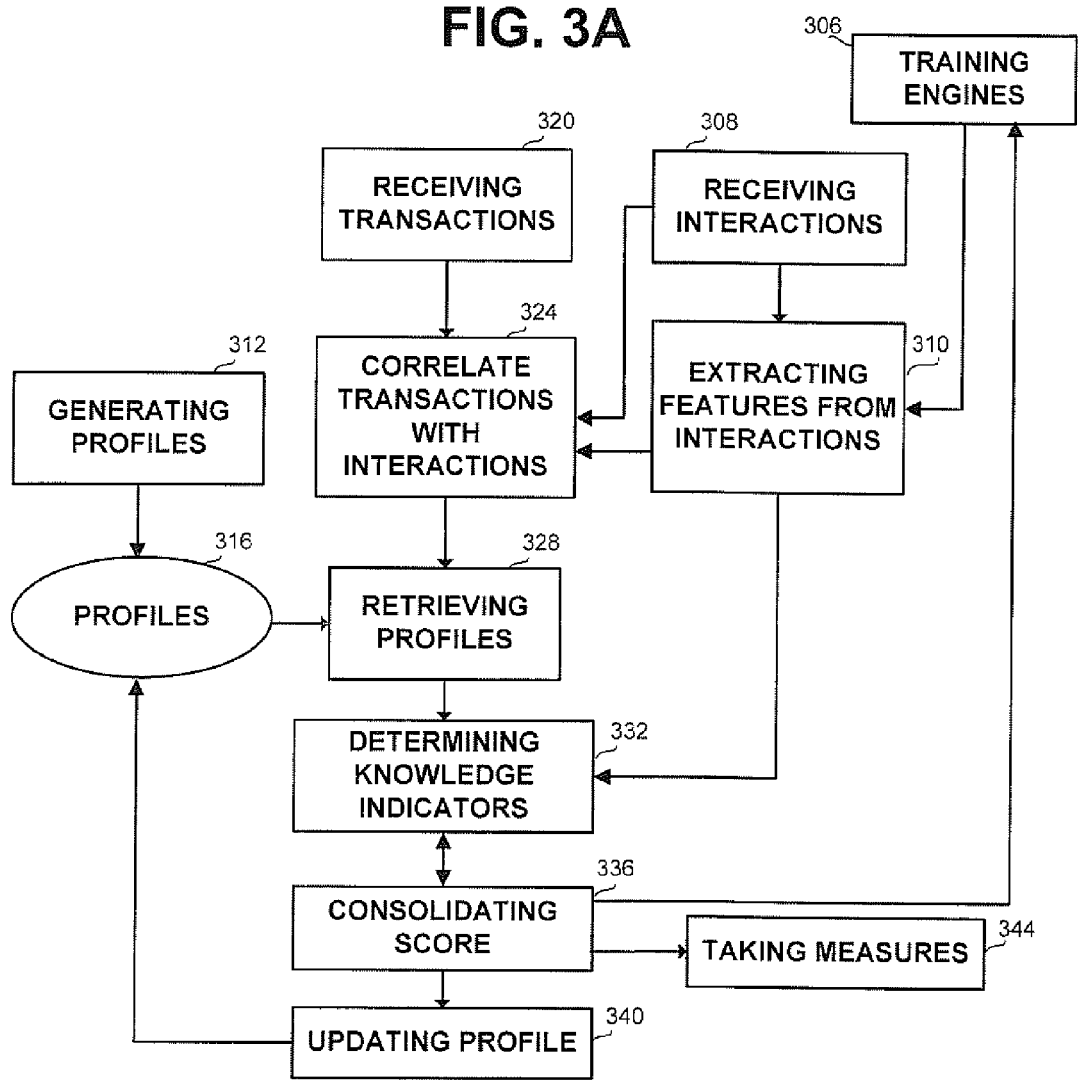
FIG. 3B is a flowchart of the main steps in a first method for fraud prevention and detection, in accordance with the disclosure.

In the structure and method of FIG. 3A and FIG. 3B, the interactions and transactions are unified into a combined structure, and the combined structure is scored, i.e., the probability that the combined structure represents a fraud or fraud attempt is determined.

Figure 4A:
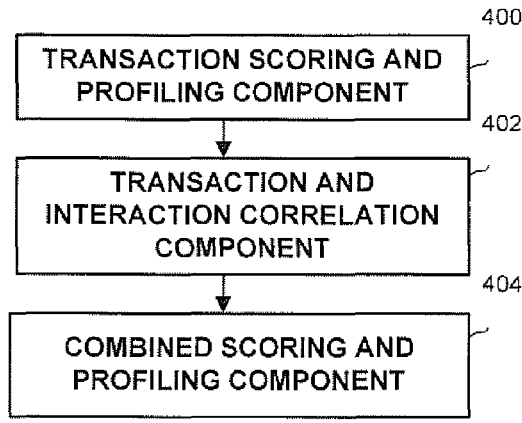
FIG. 4A is a block diagram of the main components in a second embodiment of an engine for fraud detection, in accordance with the disclosure.
Figure 4B:
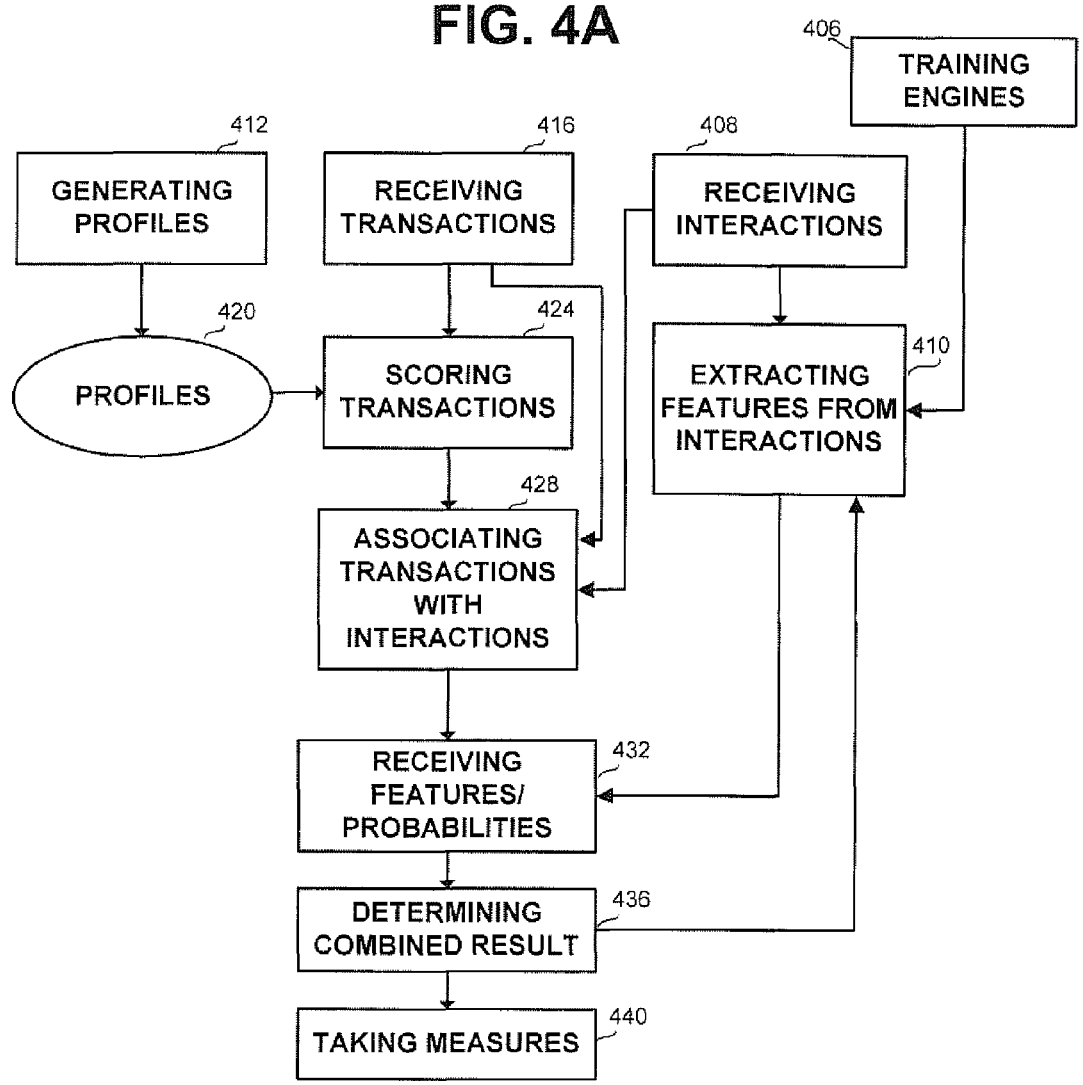
FIG. 4B is a flowchart of the main steps in a second method for fraud prevention and detection, in accordance with the disclosure.

In the structure and method of FIG. 4A and FIG. 4B, the fraud probability is determined separately for the interaction and for the corresponding transaction. The separate fraud probabilities are then combined into a unified score.

Referring now to FIG. 3A showing a block diagram of the main components in a first embodiment of fraud detection engine 144 of FIG. 1.

Fraud detection engine 344 comprises transaction and interaction correlation component 300 for correlating operational and vocal data, such as one or more interactions with one or more transactions. For example, a transaction can be made in a single telephone call between a customer and an organization. However, the transaction can also be associated with multiple interactions, such as a preliminary interaction, a more detailed interaction, and a final interaction in which the transaction is actually performed. Alternatively, multiple transactions can be made in a single interaction, such as a person calling a call center and paying multiple bills. Thus, each interaction can be associated with one or more interactions, and each interaction can be associated with zero, one or more transactions. Component 300 correlates the transactions and interactions based on identity correlations, as gathered for example by tags, identification processes or voice prints. The correlation can also use fuzzy techniques, such as fuzzy timeframe identification. The correlated transactions and interactions form a unified structure.

Fraud detection engine 144 further comprises transaction and interaction scoring component 302, for determining a fraud probability for the unified structure comprising one or more transactions and one or more interactions. Transaction and interaction scoring component 302 extracts features from the combined structure, and based on comparing the features against a combined user profile, determines the fraud probability for the structure. The extracted features comprise vocal or behavioral features, as well as features related to the transactions. The combined fraud probability indicates the probability that the structure represents fraud, either because of incompatible vocal indicators and transactional indicators, because of suspicious vocal indicators, suspicious transactional characteristics, a combination thereof, or the like. Indicators of suspicious characteristics may include a transaction in a sum exceeding the customer's usual threshold, a transaction executed in an unusual geographic area, vocal characteristics that match a speaker from a black list of known fraudsters, or the like. The nature of the transaction can be taken into account as well. For example, if a customer lives in a particular country, it is unlikely for him to purchase furniture in a second country, even if he sometimes performs transactions in the second country, such as consuming touristic services. The probability of fraud is thus determined based on past behavior of the user, vocal and transactional pattern irregularities, and known fraud patterns. The decision whether the combined interaction and transaction is fraudulent, or if additional steps are to be taken may be based on one or more policies, taking into account the fraud probability, the associated risk, available measures, and additional factors.

Fraud detection engine 144 further comprises customer profiling component 304, for generating and updating profiles of a customer from one or more transactions and one or more interactions. The profiles comprise elements related to the vocal indicators of the customer, as well as to his or her transactional characteristics, such as but not limited to: credit limit, common transactions, usual transaction sums, geographic areas in which the transactions usually take place or the like.

Referring now to FIG. 3B, showing the main steps in a flowchart of a first method for detecting and preventing fraudulent transactions with organizations.

On optional step 306 the various engines are trained, including for example determining the voice indicators that are most relevant for fraud. The indicators can range from low-level indicators, such as spectral indicators, via higher level indicators such as prosodic indicators, phonetic indicators, ideolectal indicators, dialogic indicators, and to highest level, such as semantic or personality indicators.

Spectral indicators include inherent vocal tract parameters, such as length or shape, usually modeled by spectral acoustic features like Mel-cepstrum or formant location, accent, dialog, origin, or the like, expressed in different vowels, formant structure, transitions and constant variations. Prosodic indicators include inherent intonation patterns, such as pitch, rhythm (moving or monotone), or speed. Phonetic indicators include idisyntactic phoneme production, including for example dysfunctions and full diction vs. sloppy diction. Ideolectal indicators include word usage, utterance structure, expressed in word or bi-gram frequency. Dialogic indicators include inherent discourse patterning, expressed for example in interruptions, hesitations, pauses, fillers or the like. Semantic or personality indicators indicated for example by fusing or mixing of all information and sentiment analysis.

On training step 306, the various engines are trained, such as speech to text engine 222, stress level extraction engine 217, talk pattern extraction engine 217, gender extraction engine 218, linguistic indicator extraction engine 218, voice print matching engine 220, context/language model mismatch engine 226. stress/emotion/sentiment extraction engine 227, and NLP mismatch extraction engine 228. The training comprises receiving realistic input examples, such as vocal interactions for acoustic indicators extraction engines 215, textual interactions for textual indicators extraction engines 225, or the like. In addition to the input, the training stage also receives as input manual tagging, upon which models are constructed to be used by the engines when working in testing time (also referred to as production time).

On step 308 interactions as captured in contact center, a service center or by a computerized application are received. The interactions can include vocal interaction, textual interactions or others.

On step 310, various features are extracted from the interactions by behavioral characteristic extraction components 140. Features are extracted from each interaction according to its type and the available engines. The extracted features are preferably the features that are most relevant to fraud detection. The features and their relative weights are determined on training step 306.

On optional step 312 profiles 316 are generated upon training transactions and interactions, for each user, group of users, transaction types or any other grouping. The profile comprises transactional characteristics as well as vocal or behavioral characteristics.

On step 320 transactions are received, wherein each transaction represents an operation having financial implication.

On step 324 transactions and interactions are correlated to associate each transaction with one or more interactions and each interaction with one or more transactions, and to generate a combined structure.

On step 328, relevant profiles which best match the combined structure created on step 324 are retrieved from profiles 316.

On step 332, knowledge indicators are determined for the combined structure. The knowledge indicators are features relating to the behavioral aspects as well as the transactional aspects of the combined structure.

On step 336 a score indicating the fraud probability is determined based upon the match between the knowledge indicators and the retrieved profile.

On step 340 then profile is updated according to the extracted knowledge indicators and the fraud probability. For example, if a low fraud probability has been assigned to a structure relating to a transaction in a sum higher than the usual sums for the particular user, the sums relevant for the user may be updated in the combined profile.

On optional step 344 the fraud or fraud attempt probabilities are used for any required purpose and in particular taking safety, corrective, or preventive measures, such as raising an alert, sending a message, updating reports or the like.

The fraud results can also be transferred back to training engines step 306, or to determining knowledge indicators step 332 for enhancing the features and indicators to be extracted, the extraction parameters or the like.

Referring now to FIG. 4A showing a block diagram of the main components in a second embodiment of fraud detection engine 144 of FIG. 1.

Fraud detection engine 144 comprise transaction scoring and profiling component 400, designed for creating a profile from one or more transactions/interactions, optionally related to one or more clients. For example, a profile for a particular client can indicate that the client's transactions are usually under a predetermined sum, that the transactions usually take place in one or more predetermined geographic areas, or the like. Component 400 is also designed to determine a transaction score, i.e. the probability of a transaction (with the correlated interactions) to be fraudulent, based on the customer's profile. For example, a transaction in a sum exceeding the customer's usual threshold, a transaction executed in a different geographic area or the like, an interaction that match one from a black list of known fraudsters will be assigned a high fraud probability. The nature of the transaction can be taken into account as well. For example, if a customer lives in a particular country, it is unlikely for him to purchase furniture in a second country, even if he sometimes performs transactions in the second country, such as consuming touristic services. Determining a transaction score is detailed in U.S. Pat. No. 6,965,886 and U.S. patent application Ser. No. 12/254,455 filed on Oct. 20, 2008, titled "System and method for multi layer rule processing background", the full contents of which is incorporated herein by reference.

Fraud detection engine 144 further comprises transaction and interaction correlation component 402 for correlating operational and vocal data, such as one or more interactions with one or more transactions. For example, a transaction can be made in a single telephone call between a customer and an organization. However, the transaction can also be associated with multiple interactions, such as a preliminary interaction, a more detailed interaction, and a final interaction in which the transaction is actually performed. Alternatively, multiple transactions can be made in a single interaction, such as a person calling a call center and paying multiple bills. Thus, each interaction can be associated with one or more interactions, and each interaction can be associated with zero, one or more transactions.

Fraud detection engine 144 further comprises combined scoring and profiling component 404 for combining the score determined for a particular transaction by transaction scoring and profiling component 400, with information received from behavioral characteristic extraction components 140 related to one or more interactions associated with the transaction, and determining a combined score for the transaction, indicating the probability that the transaction is fraudulent. Component 404 can thus combine a risk score determined for the transaction on step 400, with a risk score or a feature determined for the interaction, and obtain a combined score.

The probability of fraud is thus determined based on past behavior, pattern irregularities, at interaction and transaction levels, and known fraud patterns. The decision whether the interaction is fraudulent, or if additional steps are to be taken may be based on one or more policies, taking into account the fraud probability, the associated risk, available measures, and additional factors. The profile is enhanced with interaction data to generate or update a combined profile of the user.

Referring now to FIG. 4B, showing the main steps in a flowchart of a second method for detecting and preventing fraudulent transactions with organizations.

On optional step 406 the various engines are trained, including for example training any one or more of speech to text engine 222, stress level extraction engine 217, talk pattern extraction engine 217, gender extraction engine 218, linguistic indicator extraction engine 218, voice print matching engine 220, context/language model mismatch engine 226, stress/emotion/sentiment extraction engine 227. NLP mismatch extraction engine 228, transaction scoring and profiling component 235. The training comprises receiving realistic input examples, such as vocal interactions for acoustic indicators extraction engines 215, textual interactions for textual indicators extraction engines 225, or transactions for interaction scoring and profiling component 235. In addition to the input, the training stage also receives as input manual tagging, upon which models are constructed to be used by the engines when working in testing time (also referred to as production time).

On step 408 interactions as captured in contact center, a service center or by a computerized application are received. The interactions can include vocal interaction, textual interactions or others.

On step 410, various features are extracted from the interactions by behavioral characteristic extraction components 140. Features are extracted from each interaction according to its type and the available engines.

On optional step 412 profiles are generated upon training transactions, for each user, group of users, transaction types or any other grouping. On step 416 transactions are received, wherein each transaction represents an operation having financial implication. On optional step 424 each one or more transaction is scored and assigned a fraud probability or a risk score. Optionally, the profiles generated on step 412 are received on step 420 and are used in scoring step 424.

On step 428 each transaction is associated with one or more interactions, and on step 432 the features or parameters extracted from the associated interactions are received.

On step 436 the result or fraud probability of one or more interactions is determined, by combining the score determined on step 424 with the features or indications received on step 432. In one embodiment, step 424 is omitted, and the score is determined on a single step using the transactions and the interaction features.

On optional step 440 the fraud or fraud attempt probabilities are used for any required purpose and in particular taking safety, corrective, or preventive measures, such as raising an alert, sending a message, updating reports or the like.

The combined results can also be transferred back to extraction engine for enhancing the features to be extracted, the extraction parameters or the like.

It will be appreciated that the methods disclosed on FIG. 3B and FIG. 4B can comprise additional steps, such as preprocessing the interactions, performing speech to text on the interactions, or the like.

The apparatuses disclosed on FIG. 3A and FIG. 4A methods disclosed on FIG. 3B and FIG. 4B and can be used for protecting voice and other channels of financial institutes. The method and apparatus enables the compliance with Federal Financial Institutions Examination Council (FFIEC) regulations, and reduction of the time consuming ID verification phase which is required per every call.

The methods and apparatuses may operate in real-time or near real-time, i.e. a short time after the interaction finished or after the transaction was performed. The fraudulent activities may include attempts to transfer money or funds from a victim's account to another account, attempts to mislead agents by providing false information, attempts to conduct "social engineering", i.e. solicitation of agents to provide sensitive information, and other forms of attempts to conduct unlawful activities using communications.

In some embodiments, the methods and apparatuses can determine the distribution of fraud probabilities among customers, so that the organization can choose the percent of interaction or transactions which should be further inspected.

In some embodiments, the fraud probability can be associated with a particular interaction, while taking into account the risk of the associated transaction, rather than determining a risk factor for the transaction using the interactions. In said embodiments, each interaction would have a risk score assigned, reflecting the danger of fraudulent activity. The inputs for the risk scores would include the transaction data, risk assessment, and the speaker behavioral matching results.

Figure 5:
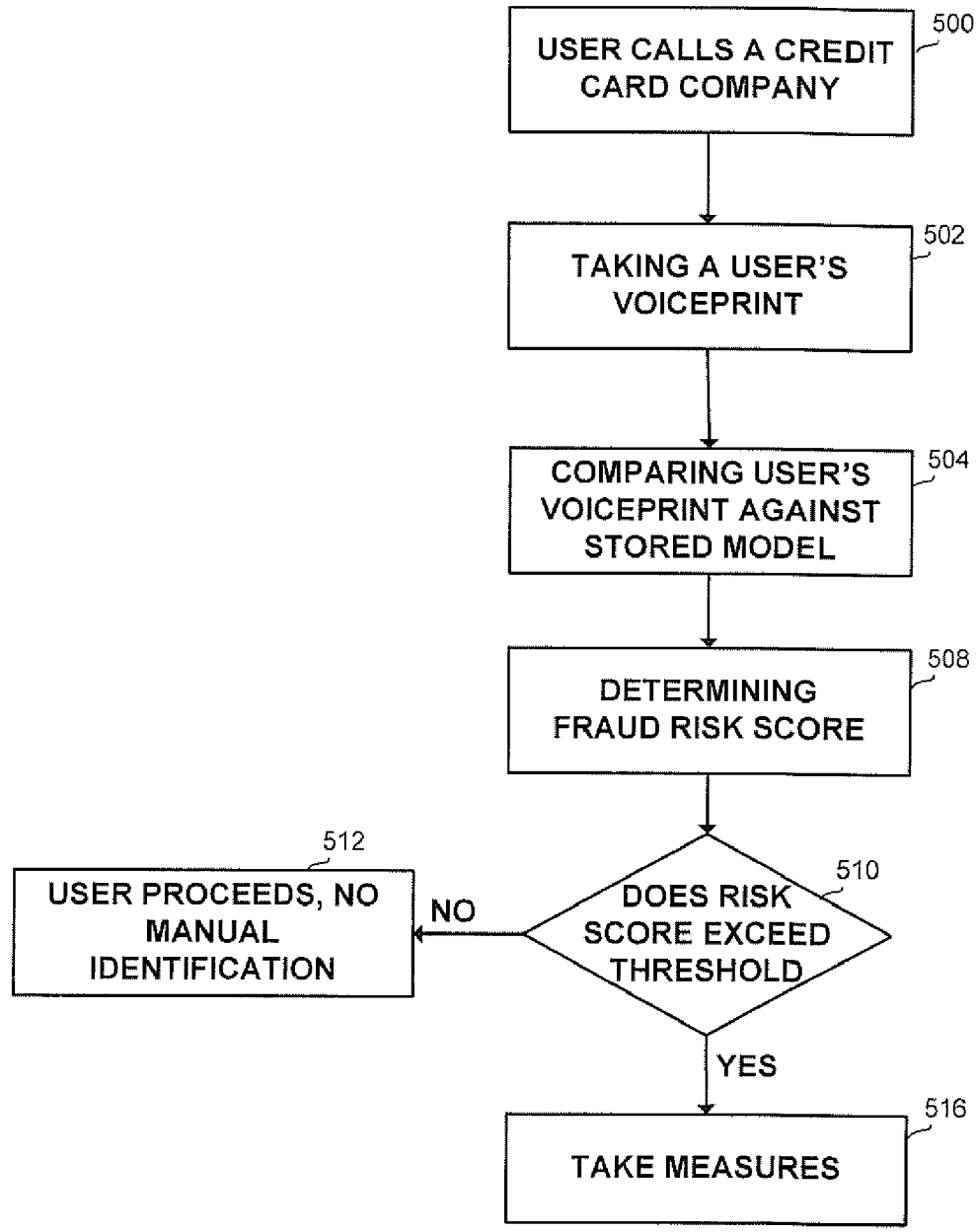
FIG. 5 is a flowchart showing the main steps in a use case of the disclosed method and apparatus.

Referring no to FIG. 5, showing a flowchart of the main steps in a use case in which the disclosed method and apparatus are used.

On step 500, a user calls a credit card company from a phone, for example to report a charge for a purchase he denies.

On step 502 a voice print, or a voice sample of the user is extracted from the interaction. On step 504 the behavioral characteristics of the user are being extracted and compared to a stored behavioral model of the alleged customer, to obtain a similarity score.

On step 508 an identity risk score is determined for the transaction, based on the similarity score or on the behavioral characteristics extracted from the interaction, their similarity to the stored model and optionally additional parameters, such as linguistic and textual features extracted from the interactions. In determining the identity risk score, the details of the transaction may also be considered, for example the value, location, or other characteristics of the allegedly fraud transaction, relatively to the regular transactions of the alleged user, or to another transaction profile. In some embodiments, the number and type of transaction denied by the user can be considered as well. On step 510 it is determined whether the fraud risk score exceeds a predetermined threshold. If the risk is below the threshold, then on step 512 the interaction continues uninterrupted, and valuable identification time is saved. Otherwise, on step 516 measures are taken, such as but not limited to: indicating the risk is to the agent so that further identification is performed, indicating the risk to a supervisor or to fraud department to follow the transaction, transferring the user to a high-risk calls handling department, or the like.

The disclosed method and apparatus determines fraud probability for an interaction or a transaction by combining features, parameters or risk score provided by engines operating upon the interactions, with risk scores determined upon the transactions. The engines extracting features can extract vocal features from a vocal interaction, textual features from a textual interaction, or textual features extracted from the transcription of a vocal interaction. The engines can also compare the voice print of a user to a stored model. The risk score determined upon the transactions can take into account various characteristics of the interaction, and a profile of a user or group of users relevant to the interaction.

The combined risk score can be used for detecting or preventing fraud activities or fraud attempts, thus reducing losses due to fraudulent activities, saving identification time, utilizing resources by focusing on problematic interactions, or the like.

It will be appreciated that the disclosed apparatus is exemplary only and that further embodiments can be designed according to the same guidelines. Thus, different, additional or fewer components or engines can be used, different parameters or features can be extracted, and various indicators or factors can be used for analyzing the transactions, including indicators or factors related to the particular interaction, the customer or beneficiary of the interaction, a group of users, general rules, or the like. The risk score as determined according to the interactions and to the transactions can be combined in multiple ways, using various weights or combinations, or the like. In some embodiments, only the risk determined according to the interactions can be used, without combining with the risk determined according to the transactions, or vice versa.

It will be appreciated by a person skilled in the art that the disclosed apparatus is exemplary only and that multiple other implementations can be designed without deviating from the disclosure. It will be further appreciated that multiple other components and in particular extraction and analysis engines can be used. The components of the apparatus can be implemented using proprietary, commercial or third party products.

It will be appreciated by persons skilled in the art that the present invention is not limited to what has been particularly shown and described hereinabove. Rather the scope of the present invention is defined only by the claims which follow.

What is claimed is:

1. A method for detecting a fraud act or a fraud attempt represented in an at least one interaction in a call center associated with an organization, the method comprising the steps of:
   receiving the at least one interaction captured by a capturing or logging computing platform device, the at least one interaction related to a customer of the organization and comprises an at least one vocal communication;
   extracting from the at least one interaction voice indicators comprising at least one of: stress, talk pattern, gender, linguistics, voice print, or an combination thereof, and performing a speech to text analysis on the at least one interaction, consequently extracting textual indicators comprising at least one of: contexts, semantics, Natural Language Processing mismatch, or any combination thereof;
   in case the at least one interaction comprises a textual communication, extracting textual indicators comprising at least one of: contexts, semantics, Natural Language Processing mismatch, or any combination thereof;
   receiving an at least one financial transaction, the financial transaction related to the customer and comprising a financial operation;
   associating the at least one financial transaction and the at least one interaction;
   scoring the at least one financial transaction against a profile of the customer, thereby obtaining a first fraud risk score;
   determining a second fraud risk score based on at least one of the voice indicators and at least one of the textual indicators;
   combining the first fraud risk score and the second fraud risk score into a combined fraud risk score; and
   generating an alert in case the combined fraud risk score exceeds a predetermined threshold.

2. The method of claim 1 further comprising the step of generating the user profile.

3. The method of claim 2 wherein the user profile comprises a behavioral characteristic and a transactional characteristic.

4. The method of claim 1 wherein at least one of the at least two features is selected from the group consisting of: a vocal feature; a behavioral feature; and a textual feature; and wherein at least one of the at least two features is a transactional feature.

5. The method of claim 1 wherein the interaction is a vocal interaction or a textual interaction.

6. The method of claim 1 further comprising a speech to text step for extracting text from the at least one interaction.

7. The method of claim 1 further comprising a training step for training at least one of the at least two extraction component.

8. An apparatus for detecting a fraud act or a fraud attempt represented in at least one transaction in a call center associated with an organization, the apparatus comprising:
   a capturing or logging computing platform device for capturing at least one interaction associated with the transaction and captured in a contact center associated with the organization, wherein the transaction is a financial transaction comprising a financial operation and the at least one interaction comprises at least one of a vocal communication or a textual communication with the organization;
   an interaction and transaction correlation component for correlating the at least one interaction with an at least one transaction;
   at least two extraction components each arranged to extract at least one first feature and the at least one second feature each of the at least one transaction and the at least one interaction respectively;
   a transaction and interaction scoring component for scoring the at least one first feature and the at least one second feature against a user profile related to the at least one transaction and a user profile related to the at least one interaction, respectively, to obtain a combined score; and
   a profiling component for generating the user profile related to the at least one transaction and a user profile related to the at least one interaction.

9. The apparatus of claim 8 wherein one of the at least two extraction components is selected from the group consisting of: an acoustic indicator extraction component; a stress level extraction engine; an emotion level extraction engine; a sentiment level extraction engine; a talk patter extraction engine; a gender extraction engine; a linguistic indicator extraction engine; a textual indicator extraction component; a context or language model mismatch extraction engine; a Natural Language Processing mismatch extraction engine and a voice print matching engine, and wherein one of the at least two extraction components is a transactional extraction component.

10. The apparatus of claim 8 further comprising a speech to text engine for extracting text from at least one vocal interaction.

11. A non-transitory machine-readable computer storage medium containing comprising instructions for performing:
   receiving at least one interaction captured by a capturing or logging the at least one interaction comprises at least one of a vocal communication or a textual communication;
   receiving the at least one transaction, the at least one transaction is a financial transaction comprising a financial operation;
   correlating the at least one transaction and the at least one interaction;
   extracting by at least two extraction components at least one first feature and at least one second feature from each of the at least one transaction and the at least one interaction respectively;
   scoring the at least one first feature and the at least one second feature against a user profile related to the at least one transaction and a user profile related to the ate least one interaction respectively, to obtain a combined score; and
   taking a safety measure in accordance with said combined score.

12. A method for detecting a fraud act or a fraud attempt represented in at least one interaction in a call center associated with an organization, the method comprising the steps of:

receiving the at least one interaction captured by a capturing or logging computing platform device, the at least one interaction comprises at least one of a vocal communication or a textual communication with the organization;

extracting at least one feature from the at least one interaction by at least one extraction component;

receiving the at least one transaction, the at least one transaction is a financial transaction comprising a financial operation;

scoring the at least one transaction against a profile to obtain a first score;

determining a second score based on the at least one feature;

combining the first score with the second score to obtain a combined score; and taking a safety measure in accordance with said combined score.

13. The method of claim 12 wherein the profile is selected from the group consisting of: a user profile, a user group profile, a transaction profile, and a transaction type profile.

14. The method of claim 12 wherein the at least one feature is a vocal feature or a textual feature.

15. The method of claim 12 further comprising a speech to text step for extracting text from at least one vocal interaction.

16. The method of claim 12 further comprising a training step for training the at least one extraction component.

17. An apparatus for analyzing at least one transaction associated with an organization, the apparatus comprising:

a capturing or logging computing platform device for capturing at least one interaction associated with the transaction and captured in a contact center associated with the organization, wherein the transaction is a financial transaction comprising a financial operation and the at least one interaction comprises at least one of a vocal communication or a textual communication with the organization;

a transaction and interaction correlation component for associating the at least one interaction with the at least one transaction;

an extraction component arranged to extract at least one feature from the at least one interaction;

a transaction scoring component for associating a first score with the at least one transaction; and a combined scoring component for combining the at least one feature with the first score to obtain a combined score for the at least one transaction.

18. The apparatus of claim 17 wherein the extraction component is an acoustic indicator extraction component.

19. The apparatus of claim 17 wherein the extraction component is a textual indicator extraction component.

20. The apparatus claim 17 further comprising a speech to text engine for extracting text from at least one vocal interaction.

21. A method for detecting a fraud act or a fraud attempt in a call center associated with an organization, the method comprising:

receiving a plurality of voice interactions related to a customer of the organization, the plurality of voice interactions captured by a logging computing platform device, the voice interactions comprising vocal communications with the organization;

receiving a plurality of financial transactions related to the customer, the plurality of financial transactions comprising financial operations;

scoring the plurality of financial transactions related to the customer against a profile of the customer, thereby obtaining a first fraud risk score;

associating the financial transactions related to the customer and voice interactions related to the customer;

extracting from the associated voice interactions voice indicators comprising at least one of:

stress, talk pattern, gender, linguistics, voice print, or any combination thereof;

performing speech to text analysis on the associated voice interactions, and consequently extracting textual indicators comprising at least one of: contexts, semantics, Natural Language Processing mismatch, or any combination thereof;

determining a second fraud risk score based on at least one of the voice indicators and at least one of the textual indicators;

combining the first fraud risk score and the second fraud risk score into a combined fraud risk score; and generating an alert regarding the fraudulent interactions and transactions in case the combined fraud risk score is exceeds a predetermined threshold.

* * * * *